United States Patent [19]
Brown et al.

[11] Patent Number: 5,257,496
[45] Date of Patent: Nov. 2, 1993

[54] COMBUSTION CONTROL FOR PRODUCING LOW $NO_x$ EMISSIONS THROUGH USE OF FLAME SPECTROSCOPY

[75] Inventors: Dale M. Brown, Schenectady; Bernard Gorowitz, Clifton Park, both of N.Y.

[73] Assignee: General Electric Company, Schenectady, N.Y.

[21] Appl. No.: 878,933

[22] Filed: May 5, 1992

[51] Int. Cl.$^5$ .............................................. F02C 9/28
[52] U.S. Cl. .................. 60/39.06; 60/39.281; 60/39.5
[58] Field of Search ............. 60/39.06, 39.091, 39.281, 60/39.5

[56] References Cited

U.S. PATENT DOCUMENTS 5,024,055  6/1991  Sato .................................. 60/39.281

FOREIGN PATENT DOCUMENTS 92326   7/1981  Japan ................................. 60/39.281
197726  9/1986  Japan ................................. 60/39.281

OTHER PUBLICATIONS

F. Frain, "Research into a Spectral Flame Analyzer Phase 1—Final Report for the Period Apr. 21, 1983–Jun. 30, 1985", *Work Performed under United States Department of Energy Contract DE-AC0-7-831D12463; Jun. 1, 1985.*

"Rosemount Optical Light–Off Detector for Stationary Turbine Engines", Rosemount Inc. Catalog, Rosemount Inc., Aerospace Division, 1256 Trapp Road, Eagan, Minn. 55121, Feb. 1992.

*Primary Examiner*—Louis J. Casaregola
*Attorney, Agent, or Firm*—Marvin Snyder

[57] ABSTRACT

Combustion in a gas turbine is controlled through use of flame spectroscopy in order to achieve low $NO_x$ emissions in the exhaust. By monitoring the combustion flame in the turbine to determine intensity of non-infrared spectral lines, and dynamically adjusting the fuel/air ratio of the fuel mixture such that this intensity remains below a predetermined level associated with a desired low level of $NO_x$ emissions, the engine produces significantly reduced $NO_x$ emissions in its exhaust but at a sufficiently high combustion flame temperature to avoid any undue risk of flame-out, thereby assuring stable, safe and reliable operation.

50 Claims, 5 Drawing Sheets

COMBUSTION CONTROL FOR PRODUCING LOW $NO_x$ EMISSIONS THROUGH USE OF FLAME SPECTROSCOPY

BACKGROUND OF THE DISCLOSURE

1. Field of the Invention

This invention relates to methods and apparatus for controlling combustion to minimize nitrogen oxide emission and, more particularly, to use of flame spectroscopy to control gas turbine combustion in a manner that reduces nitrogen oxide emissions without increased risk of flame-out.

2. Description of the Prior Art

Gas turbines are extensively used as power plants for a wide diversity of applications ranging from, for example, land based engines for gas fired electrical generators or pipeline compressors, to shipboard or airborne engines for, respectively, marine or aeronautical propulsion.

Gas turbines burn hydrocarbon fuel which may include natural gas, e.g. methane, for a land based application or kerosene, for use as an aviation (jet) fuel. As with all forms of combustion, these turbines emit an exhaust stream that contains various combustion products. While some of these combustion products, such as water vapor, are essentially harmless to the environment, others may not be and, for that reason, are classified as pollutants. Accordingly, a major effort involving, inter alia, turbine manufacturers is presently underway to produce gas turbines having significantly reduced pollutant emissions and/or to retrofit existing gas turbines so as to significantly reduce their present levels of pollutant emission. Of these pollutants, the turbine industry is especially concerned with reducing emission of various forms of nitrogen oxide, collectively referred to as "$NO_x$".

It is widely known that, for a gas turbine, $NO_x$ emissions increase significantly as the combustion temperature rises. It is also known that operating a turbine in a so-called "lean-burn" condition, which involves use of a lean mixture of fuel and combustion air (i.e., a relatively low fuel-to-air ratio), reduces the combustion temperature to a level that significantly reduces $NO_x$ emissions. However, if the mixture is too lean, the turbine exhibits operational instabilities which may increase to a point at which the internal combustion flame is extinguished, i.e. a "flame-out" occurs and the turbine ceases generating power. Generally, in a land based application, the turbine may be restarted after a flame-out with few, if any, adverse safety consequences even if a relatively protracted period of time is required to restart the turbine. To a large extent, this is also true for various marine applications. Accordingly, turbines designed for land (and many marine) applications can be operated under appropriate lean-burn conditions and can be restarted from time-to-time if necessary due to flame-out. However, safety concerns inherent in most aeronautical turbine applications (i.e. use of jet engines to power aircraft) require preclusion of a flame-out under certain operating conditions, such as on take-off, and, under other operating conditions, preclude attempted turbine restart over a protracted length of time.

To assure that a flame-out will not occur in an aircraft (jet) engine, the engine is frequently adjusted to operate with a "rich" fuel/air mixture, i.e., with a relatively high fuel-to-air ratio. While this results in stable engine operation, it also produces high $NO_x$ emission levels. While heretofore such high $NO_x$ emission levels have been tolerated as a cost of safe operation, environmental concerns have heightened to the point at which these emission levels need to be significantly reduced but with no ensuing diminution in operational safety.

Traditionally, most turbines rely on using a fuel to air mixture that is preset during turbine manufacture and testing to conform with an expected operating condition for the turbine, e.g. a mixture that will establish a "rich" condition for a jet engine. Apart from a throttle valve for regulating fuel flow and hence engine speed and power output, turbines generally employ no valving or other adjustments that can be used to dynamically change the turbine operating conditions, let alone change the fuel/air mixture to reduce $NO_x$ emissions.

Currently, there is no known closed-loop feedback technique for controlling a turbine, including that of a jet engine, to operate in a lean-burn condition. This is due to both the paucity of usable turbine adjustments, as noted above, as well as various difficulties associated with accurately detecting the level of $NO_x$ emissions produced by the turbine and abating these emissions in real-time and, in the case of a jet engine, without jeopardizing safe turbine operation.

At first blush, one might consider coupling a vacuum mass spectrometer, or similar device, to a gas turbine to sample the turbine exhaust and perform a spectral analysis of the sample to determine its contents by substance and concentration. Unfortunately, spectral analyzers are slow, typically requiring upwards of 10-30 seconds to generate usable results. Such time lag renders impractical use of a spectrometer or similar device to provide a real-time measurement of $NO_x$ emissions and to accurately and dynamically control a gas turbine, and especially a jet engine, to operate in a "lean-burn" condition.

Current spectral measurement based $NO_x$ abatement techniques that are thought to be suitable for use with combustion furnaces or even with land or marine based turbines present drawbacks that are so severe as to frustrate their use in jet engines. One such boiler-based technique involves directly measuring broad-band infrared radiation emitted by a combustion flame and comparing desired concentrations of various combustion products, specifically oxygen ($O_2$), carbon dioxide ($CO_2$), carbon monoxide (CO) and $NO_x$, to those concentrations which actually occur in both a flue and stack. A gas mixture valve on the burner operates under programmed control to maximize, and then maintain, the infrared radiation emitted by the flame in view of measured differences between the actual and desired concentrations of these combustion products.

Rather than measuring broad-band infrared radiation, another boiler-based technique involves controlling the fuel/air ratio of multi-burner boilers based on measurements of two single spectral lines in each burner flame: an infrared carbon dioxide ($CO_2$) line at 4.4 $\mu$m (micrometers) and an ultraviolet hydroxyl (OH) line at 300 nm (nanometers), respectively. An intensity ratio based on the measured values of these two lines for each burner is determined and then used to separately control the fuel/air mixture of that burner in order to achieve near stoichiometric combustion, which advantageously occurs at a fuel/air ratio that reduces the amount of $NO_x$ that heretofore has generally been emitted by multi-burner boilers. See, e.g., F. Fraim, "Research into a Spectral Flame Analyzer Phase 1—Final Report for the Period Apr. 21, 1983—Jun. 30, 1985", Work Performed under United States Department of Energy Contract DE-AC07-831D12463, Jun. 1, 1985.

Specifically, while suitable detectors, such as photodiodes, exist that can readily sense infrared radiation, the high temperature of, illustratively, an operating jet engine itself causes various engine components to emit intense amounts of radiation over the entire infrared spectrum. In addition, the jet fuel flame generally emits a large amount of unburned carbon particles which themselves function as infrared black body radiators in contrast to a "clean" natural gas flame which does not emit such particles. The resulting background level of infrared radiation is sufficiently high to completely, or almost completely, mask the radiation associated with the $CO_2$ spectral line as well as radiation associated with other desired spectral components in the infrared spectrum. Consequently, any technique predicated on measuring radiation in the infrared spectrum produced by the flame would likely be impaired by the radiant energy produced by the jet engine itself and thus provide highly erroneous measurements.

Faced with the apparent inability to control $NO_x$ emission based upon spectral measurements, the turbine industry has turned to water injection for this purpose. By injecting water into the fuel stream, the turbine combustion temperature is reduced, thereby reducing $NO_x$ emissions. This technique, however, carries several severe practical limitations which usually render it unsuitable for use in many marine turbine applications and certainly in jet engines. Specifically, if ordinary drinking water is used, then as that water evaporates within the turbine, minerals, such as calcium, precipitate out of the water and form deposits over various internal components. If these deposits are allowed to accumulate, the close mechanical tolerances between adjacent internal components will cause these components to bind and thereby substantially reduce the turbine service life. To avoid this type of damage, one of two approaches is typically taken: either the turbine is routinely removed from service to undergo removal of accumulated deposits, or purified water injection is used. The former approach is likely to be costly both in terms of turbine downtime and maintenance expense and, for that reason, is generally avoided. The latter approach, while relatively simplistic, often requires use of either appropriate water purification equipment with an attendant energy source and equipment maintenance requirements, or a suitably large tank or other source to supply a continual source of demineralized water. A stationary land based turbine is usually sited near an ample supply of such water or at a location which can accommodate the extra space required for either this equipment and/or a tank. Available space for such purification equipment or a tank is clearly at a premium aboard a marine vessel and simply nonexistent aboard an aircraft. Furthermore, various by-products of water purification, such as precipitated minerals and the like (including salt if sea water is being purified) can present a disposal problem in and of themselves. Accordingly, water injection is rarely used for marine applications and not at all for jet engines.

Thus, a need exists for a technique that can substantially reduce turbine $NO_x$ emissions by operating the turbine in a "lean-burn" condition. Such technique should not rely on either water injection or detection of infrared emissions, and should provide closed-loop feedback control to assure safe, stable turbine operation by preventing unintended "flame-out". In addition, the technique should be readily amenable to inclusion in existing turbines, on a retrofit basis, as well as to inclusion in new turbines during their manufacture.

SUMMARY OF THE INVENTION

Our invention advantageously overcomes the deficiencies associated with $NO_x$ emission control techniques known in the art for use with turbines, including those of jet engines. In addition, almost every form of gaseous or liquid hydrocarbon burner emits the environmentally harmful $NO_x$ pollutant and is therefore useable in the invention.

We have discovered that the intensity of the carbon monoxide (CO) spectral lines in the ultraviolet region, situated within, for example, a band of approximately 200–250 nm in the combustion flame of a turbine, such as employed, illustratively, in a jet engine, is closely correlated with the fuel/air ratio at which the engine is operating, the combustion flame temperature within the engine and the amount of $NO_x$ exhaust emissions that will be produced. By monitoring intensity of these CO lines for the combustion flame and dynamically adjusting the fuel/air ratio of the engine such that this measured intensity remains below a predetermined level associated with a desired low level of $NO_x$ exhaust emission, such as approximately 25 ppm (parts/million), the engine will continually produce significantly reduced $NO_x$ exhaust emissions but at a sufficiently high combustion flame temperature to preclude the instabilities that lead to a flame-out condition, thus facilitating stable, safe and reliable engine operation.

Advantageously, this band of ultraviolet CO lines is spectrally isolated from other spectral lines that occur in the flame and is relatively unaffected by infrared and/or visible light emissions from either the exhaust stream or hot engine components. As such, the $NO_x$ emissions in the exhaust can be accurately, though inferentially, determined even in the presence of the substantial background radiation from the engine and the exhaust stream.

In accordance with a preferred embodiment of our invention, the intensity of the band of CO spectral lines is detected through a suitable high temperature detector, such as a silicon carbide (SiC) photodiode. Such photodiode has a spectral response characteristic exhibits good ultraviolet sensitivity in the 200–300 nm band, and particularly within the 200–250 nm band, and provides a measurement value representing an integral of the intensity over all the CO spectral lines in this band. Advantageously, SiC photodiodes, irrespective of the size of the energy bandgap, are insensitive to infrared radiation.

The diode output signal, after suitable signal conditioning, scaling and digitization, is first converted, typically through a table look-up operation implemented within a microcomputer system, into a corresponding actual value for $NO_x$ emission concentration. Thereafter, the microcomputer system ascertains any difference between the actual $NO_x$ concentration value (or flame temperature) and a desired value thereof representing the desired operating condition for the engine and converts the difference, through another table look-up operation, into a corresponding positional error signal. A servo-controlled vernier (or similar) valve is situated in parallel with the main fuel line to each fuel injector in the combustor stage of the jet engine and functions to dynamically vary the fuel/air mixture for any given throttle position. With this arrangement, the positional error signal is supplied, through suitable drive circuitry, to an actuator, e.g. a stepper motor, that drives each such valve to an appropriate setting that adjusts the fuel/air ratio to operate the engine continually in a "lean-burn" condition with CO and $NO_x$ emission levels in the exhaust being accurately maintained, in real-time, at their desired low levels but with a sufficiently high combustion flame temperature to prevent a flame-out condition from occurring.

Although jet engines generally produce a single annularly-shaped combustion flame, this flame is not likely to be uniform throughout its entire volume. In this regard, a conventional aircraft jet engine contains a number of fuel injectors arranged peripherally around, and concentric with, the combustion chamber of the engine. A similar arrangement is used for the combustor stage of a gas turbine fueled by methane (natural gas) rather than jet fuel (kerosene). Flame nonuniformities may result from, for example, slight imbalances in fuel flow among these injectors and/or slight air flow irregularities within the combustor stage itself. Such nonuniformities may result in localized differences in flame temperature which lead to an increased level of $NO_x$ emissions in the engine exhaust and attributable to different performance of one injector compared to that of another injector.

Accordingly, a feature of our invention allows the combustion flame to be measured at multiple points around the combustion chamber and controlled in a locally distributed fashion to reduce these flame nonuniformities, thereby reducing the overall level of $NO_x$ in the engine exhaust. Specifically, a series of SiC photodiodes (or other suitable ultraviolet detectors) are preferably situated peripherally around, and concentric with, the engine combustion chamber, with adjacent diodes being uniformly spaced apart. Each diode is mounted in a suitable housing affixed to an external surface of the combustion chamber and properly aimed to monitor, through a suitable high temperature window, a portion of the combustion flame in a volumetric region near each corresponding fuel injector. A separate vernier valve is associated with each such injector. The measurements obtained through these diodes can be averaged by the microprocessor to establish an average error signal for application to each of the servo-controlled vernier valves. Alternatively, the output signal of each diode can be used by the microprocessor to establish an error signal for controlling the servo-controlled vernier valve for the corresponding fuel injector. In either case, use of simultaneous measurements of flame CO ultraviolet spectral emissions from multiple detectors will result in $NO_x$ exhaust emission and flame temperature control of greater accuracy than obtainable through use of a single ultraviolet detector.

Accordingly, one object of the present invention is to provide a control for combustion within a gas turbine to minimize $NO_x$ emission without increased risk of flame-out.

Another object of the present invention is to provide a hydrocarbon burner control system utilizing a silicon carbide photodiode to monitor radiation from the burner flame in a band of non-infrared wavelengths.

Another object of the present invention is to provide a combustion control for a hydrocarbon burner that minimizes $NO_x$ emission through monitoring of ultraviolet radiation produced by the flame.

BRIEF DESCRIPTION OF THE DRAWINGS

The features of the invention believed to be novel are set forth with particularity in the appended claims. The invention itself, however, both as to its organization and method of operation, together with further objects and advantages thereof, may best be understood by reference to the following description taken in conjunction with the accompanying drawing(s) in which:

DETAILED DESCRIPTION

The broad teachings of our invention for substantially reducing $NO_x$ emissions are applicable to nearly any internal combustion engine that relies on combustion of a mixture of hydrocarbon-based fuel and air to generate power and, as a by-product, produces nitrogen oxides. Although these engines include turbine engines, such as used in land, marine or aeronautical applications, for the sake of brevity the invention is hereinafter described for use with, illustratively, a jet engine or gas turbine. Moreover, the flame produced by almost any form of gaseous or liquid hydrocarbon burner can be monitored, for purposes of combustion control to minimize $NO_x$ emission, by use of the teachings herein.

Figure 1:
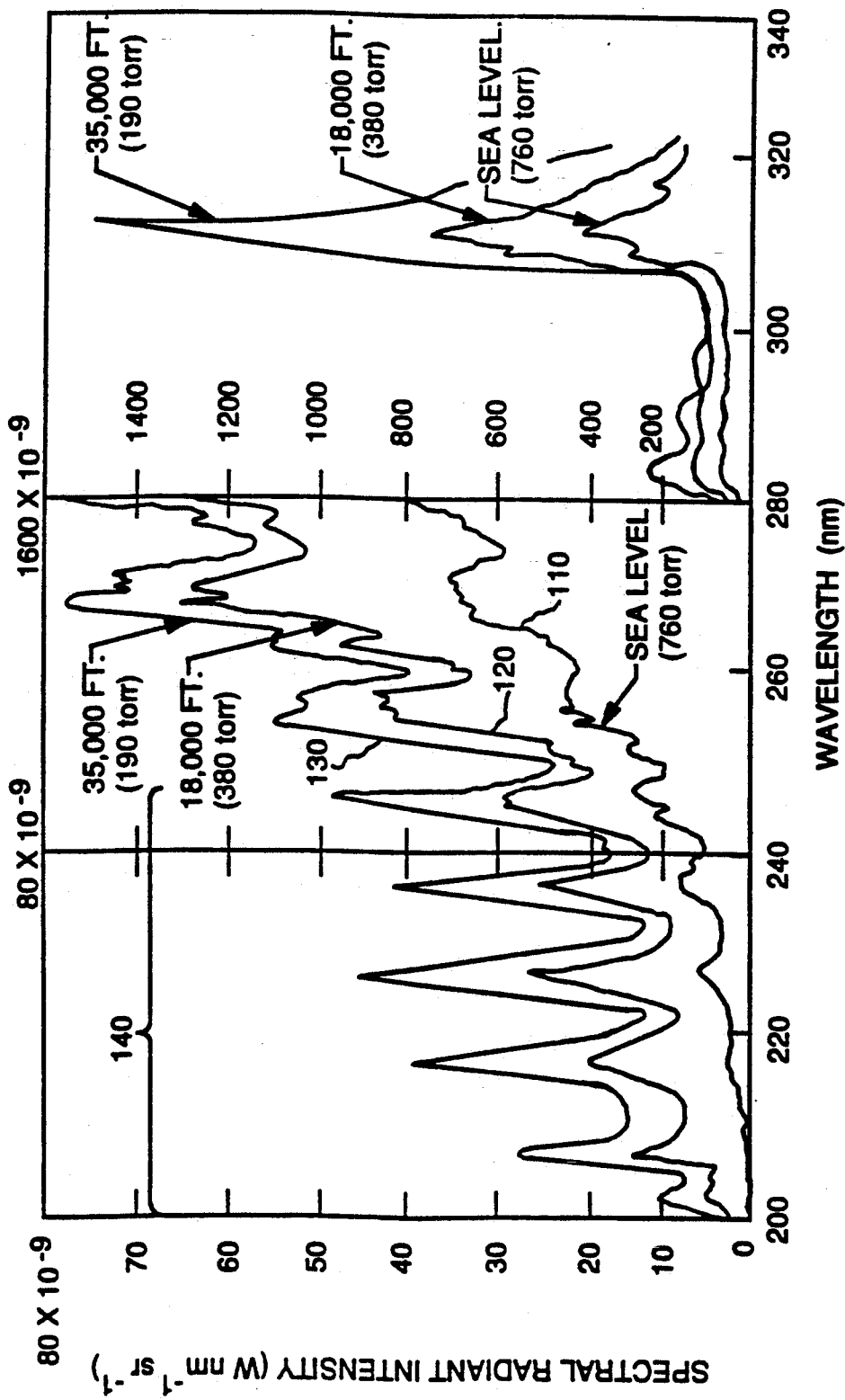
FIG. 1 graphically illustrates various ultraviolet spectral emissions, in the range of 200-340 nm, from JP-4 jet fuel burning at various altitudes.

FIG. 1 graphically depicts ultraviolet spectral emissions, measured in watts per nm per sr (steradian), in the range of 200-340 nm, from JP-4 jet fuel burning at various altitudes. Curves 110, 120 and 130 represent typical ultraviolet spectral lines that occur for jet fuel burning at sea level, at approximately 5500 m (meters) or 18,000 feet, and at approximately 10,700 m or 35,000 feet, respectively, and all exist within a band extending from 200 nm to 340 nm. An intense line located at approximately 310 nm is attributable to presence of the hydroxyl radical (OH), while the lines below approximately 260 nm are believed to result solely from the presence of carbon monoxide (CO). As is clearly evident, multiple distinct spectral lines occur in a band 140 ranging between approximately 200 nm and approximately 250 nm in wavelength. Fortunately, spectral radiance from engine exhaust and/or hot jet engine parts, as well as black body radiation emanated by hot particles of unburned carbon contained in the combustion flame, is primarily concentrated in the infrared spectrum and is essentially negligible under 300 nm in wavelength. Consequently, these effects, which would mask spectral measurements in the infrared and visible regions, will not corrupt spectral measurement at these ultraviolet wavelengths. Furthermore, these CO lines are not overlapped by other intense emission lines.

We have also found, through spectral measurements of a combustion flame in a high pressure gas turbine test rig, that a strong correlation exists between intensity of these ultraviolet CO lines for the combustion flame and the fuel/air ratio of the turbine. As air flow increases, flame temperature decreases, causing a change in the collective intensity of CO spectral lines.

It is well known that the concentrations of CO and $NO_x$ in the exhaust gas of a gas turbine vary with flame temperature. In this regard, curves 210 and 220 of FIG. 2 respectively show the expected dependence of the concentration of emitted CO and $NO_x$ on temperature at the base of the combustion flame. As shown, CO concentration decreases steeply with increasing flame temperature, reaching a knee (at point P) at approximately 1710° K. This concentration continues to decrease at an increasingly slower rate until the flame temperature reaches approximately 1800° K., after which the concentration slowly increases with further increases in flame temperature (not shown). Furthermore, substantial levels of emitted CO, indicated by dashed line 230 at a relatively low flame temperature FO, indicate onset of a flame-out condition. CO emission levels increase exponentially as flame temperature is reduced below the flame temperature associated with point P. A desired environmental limit on such CO emissions is shown as level $E_{CO}$. The $NO_x$ concentrations remain quite low (typically less than 25 ppm) at low flame temperatures, such as below approximately 1740° K., but undergo an exponential rise at increasingly higher combustion temperatures.

Figure 2:
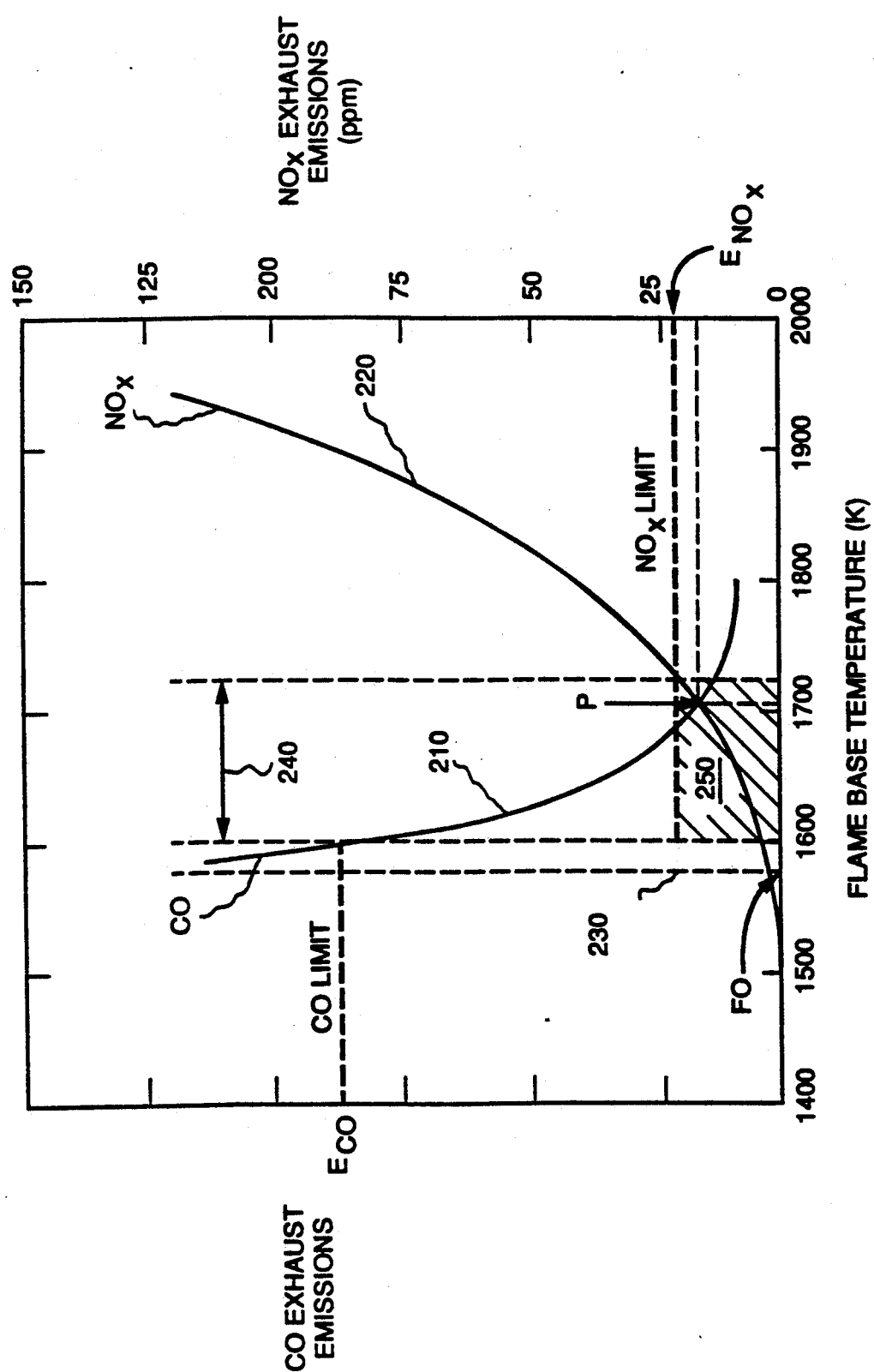
FIG. 2 graphically illustrates relative concentrations of CO and $NO_x$ in the exhaust gas of an operating gas turbine or jet engine, plotted as a function of combustion flame temperature.

To avoid a flame-out condition, while advantageously reducing both CO and $NO_x$ exhaust emissions below corresponding desired environmental limits (slightly less than approximately 25 ppm, as indicated by level $E_{NOx}$), a jet engine or gas turbine should be operated within a relatively small flame temperature band 240 and particularly within rectangular operating region 250 that encompasses point P, as shown in FIG. 2. Since the $NO_x$ limit $E_{NOx}$, in ppm, is numerically lower than the CO limit $E_{CO}$, the $NO_x$ limit defines the upper boundary of operating region 250.

A jet engine operated in a "lean-burn" condition emits $NO_x$ at levels of 25 ppm and less. Ideally, then, to minimize both $NO_x$ and CO concentrations in the exhaust, a jet engine should be operated approximately at point P of FIG. 2, i.e. with a flame temperature of approximately 1700° K. Point P exists within a narrow operating temperature bandwidth, i.e., approximately 120° K. Hence, if the fuel mixture should become so lean as to result in a sufficient decrease in flame temperature, the jet engine may undergo operational instabilities which can quickly increase to a point at which the combustion flame is extinguished and the jet engine ceases generating power.

To assure that a flame-out will not occur, jet engines conventionally use a rich fuel-to-air mixture that is preset during engine manufacture and testing to produce flame temperatures well above 1740° K., throughout a useful output power range. This provides safe and reliable engine operation but at the cost of relatively high $NO_x$ emissions. Because jet engines generally employ no adjustments for dynamically varying the rate of fuel individually supplied at each injector, the mixture that is set during engine manufacture generally remains at that setting thereafter. Thus, given the desire to assure safe and reliable operation, an aircraft jet engine is essentially never configured to operate in a lean-burn condition.

In accordance with the invention, by monitoring intensity of the CO lines for the combustion flame within a band of approximately 200–300 nm, which falls within the ultraviolet portion of the spectrum, and preferably within a band of approximately 200–250 nm, and dynamically adjusting the fuel/air ratio of the engine to keep the measured intensity below a predetermined level associated with a desired level of $NO_x$ emissions (such as that associated with point P in FIG. 2), the engine will produce significantly reduced $NO_x$ emissions in the exhaust but at a sufficiently high combustion flame temperature to prevent occurrence of a flame-out condition while simultaneously facilitating stable, safe and reliable engine operation. Because, as noted above, this 200–300 nm band of ultraviolet CO lines is spectrally isolated from other spectral lines that occur in the flame and is relatively unaffected by infrared and/or visible light emissions from either the exhaust stream or hot engine components, the $NO_x$ emissions in the exhaust can be accurately determined despite substantial background radiation emitted by the engine and the exhaust stream. The intensity of the band of CO spectral lines is detected by a silicon carbide photodiode. Specifically, a separate respective diode can be used to detect the flame characteristics in the vicinity of each fuel injector or in the vicinity of several fuel injectors in the engine. The output signal of each such diode, processed through a suitable microprocessor, controls the position of a corresponding servo-controlled vernier fuel valve to dynamically vary the amount of fuel supplied to a corresponding injector. The fuel supplied to all the injectors is collectively adjusted through these valves to dynamically adjust the fuel/air mixture of the engine, in real-time, to operate the engine in a lean-burn condition while maintaining the combustion flame at a sufficiently high temperature to prevent flame-out.

Figure 3:
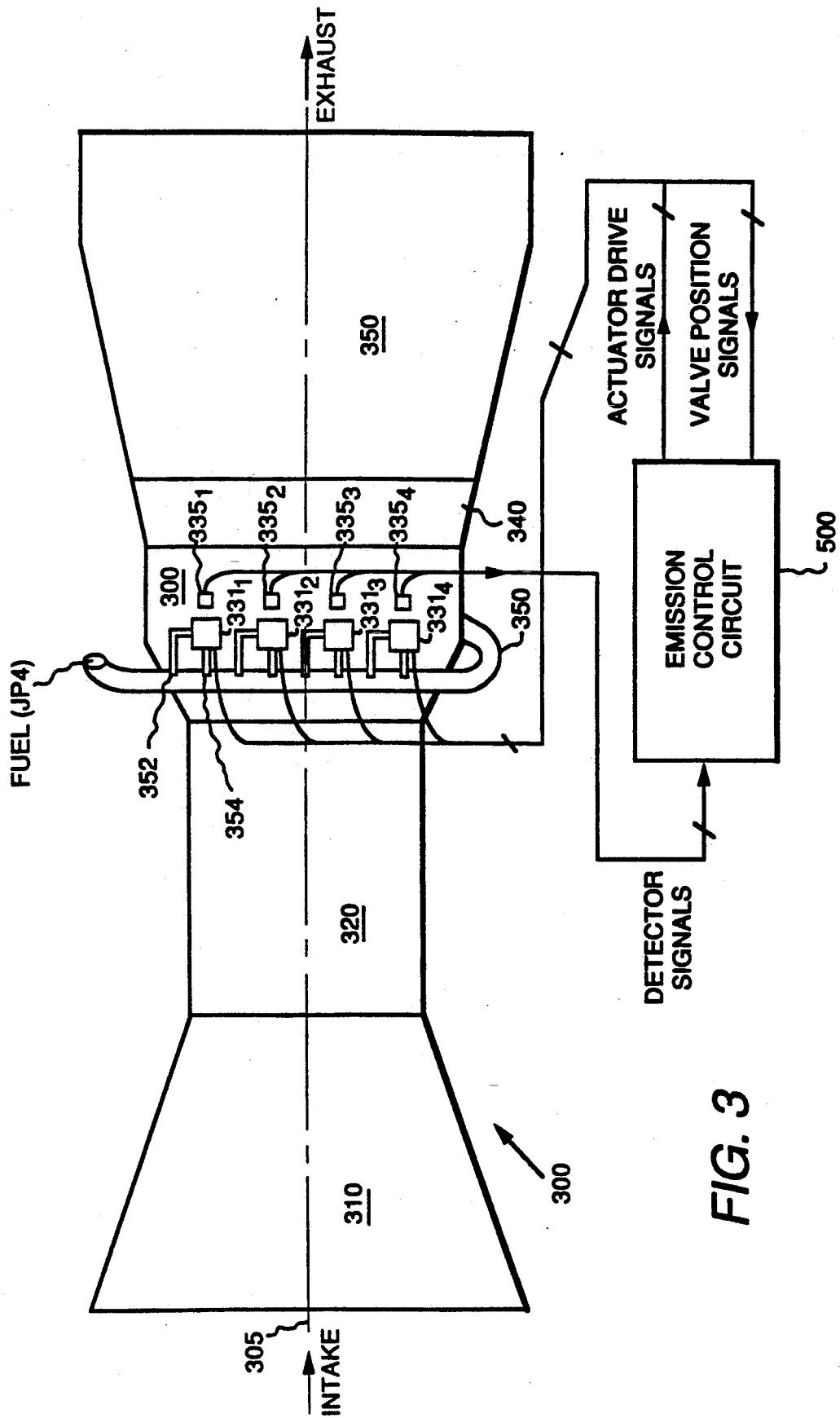
FIG. 3 is a simplified outline drawing of a jet engine that incorporates the present invention.

With this overview, FIG. 3 is a simplified outline drawing of a jet engine 300 that incorporates the present invention. Jet engine 300 contains five successive coaxially aligned conventional stages: low pressure compressor stage 310, high pressure compressor stage 320, combustor 330, high pressure turbine stage 340 and low pressure turbine stage 350. Collectively, low and high pressure compressor stages 310 and 320 compress incoming intake air to a desired high pressure for use as combustion air. Combustor 330 injects jet fuel, e.g. JP-4, into the combustion air, using a series of fuel injectors, and establishes controlled internal combustion of the resulting fuel/air mixture. Hot expanding exhaust gases generated by the combustion are successively routed to high and low pressure turbine stages 340 and 350, respectively, which collectively extract power from the exhaust gases to suitably drive compressor stages 310 and 320 through common shafting (not shown). The gases expelled by the low pressure turbine exit the engine as exhaust. Since stages 310, 320, 340 and 350 are conventional, they are not discussed in greater detail hereinafter.

Combustor stage 330, shown in FIG. 3, contains a series of fuel injector assemblies 331, formed of individual injector assemblies $331_1$, $331_2$, $331_3$, $331_4$, . . . (of which only four are shown) situated at regular spacings completely around the periphery of an outer wall of the combustor stage and concentric with longitudinal axis 305 of the engine. Each of these assemblies, such as assembly $331_1$ which is discussed in greater detail below in conjunction with FIG. 4, includes a fuel injector which appropriately directs jet fuel into a combustion area, and a corresponding vernier valve to dynamically vary the fuel/air mixture for that particular fuel injector. The term "vernier valve" as used herein includes poppet valves which are positioned to be either opened or closed, for the purpose of finely adjusting the fuel supplied to the combustor flame.

Fuel manifold 350, shown in FIG. 3, supplied with jet fuel from an appropriate fuel pump (not shown), routes jet fuel in parallel to each of the injector assemblies. Each fuel injector itself, as well as the corresponding vernier valve situated within the associated injector assembly, are connected in parallel, through two separate fuel lines, to manifold 350, such as by fuel lines 352 and 354 for injector assembly $331_1$. If vernier valves are not employed, the amount of fuel supplied to each of the injectors is regulated by the diameter and length of the path traversed by the fuel through the manifold and associated fuel line, such as fuel line 354, and the flow rate at which fuel is pumped through the manifold to the engine. Ideally, since all the fuel lines that directly connect the fuel injectors to the manifold are approximately equal in size (both diametrically and lengthwise), all of the injectors should receive equal amounts of fuel directly from manifold 350. During engine manufacture and testing, the overall fuel/air mixture for the engine is set such that with, illustratively, all the vernier valves approximately half open the engine operates in a desired lean-burn condition, such as at point P shown in FIG. 2. This results in sufficiently high flame temperatures to prevent a flame-out condition but with substantially reduced levels of both CO and $NO_x$ emitted in the engine exhaust. Subsequently, each of the vernier valves is dynamically controlled to maintain the fuel/air mixture for its corresponding injector at this point.

To detect the spectral emissions from a portion the base of the combustion flame and attributable to each respective injector, an ultraviolet optical detector is secured to the outer wall of the combustion stage near each respective injector assembly and, through a suitable high temperature optical window, monitors that portion of the flame. In this regard, a detector assembly 335, formed of individual detectors $335_1$, $335_2$, $335_3$, $335_4$, . . . (only these four individual detectors 335 are specifically shown) is mounted around the periphery of the outer surface of the combustion stage and concentric with longitudinal axis 305. Each individual detector is mounted in the vicinity of a respective fuel injector assembly, though the exact spacing therebetween is not critical and, to some extent, is dictated by a designed flame geometry within the combustion stage.

The outputs of the individual detectors are routed to emission control circuit 500. This circuit generates suitable drive signals through use of both the output signals produced by the detectors and valve position feedback signals produced by the fuel injector assemblies. Each drive signal is applied to a respective actuator (not shown) located within a corresponding fuel injector assembly. The respective actuator appropriately changes the position of an internal valve element within the vernier valve located in this assembly to increase or decrease the amount of fuel flowing to the corresponding injector and hence therefrom into the combustion chamber itself, thereby changing the fuel/air mixture associated with that injector. Each of the position feedback signals specifies the position of the valve element within the corresponding vernier valve. The position of each such element is thus dynamically adjusted to appropriately vary the fuel/air mixture for all the fuel injectors such that jet engine 300 continuously operates at a desired "lean-burn" condition.

Figure 4:
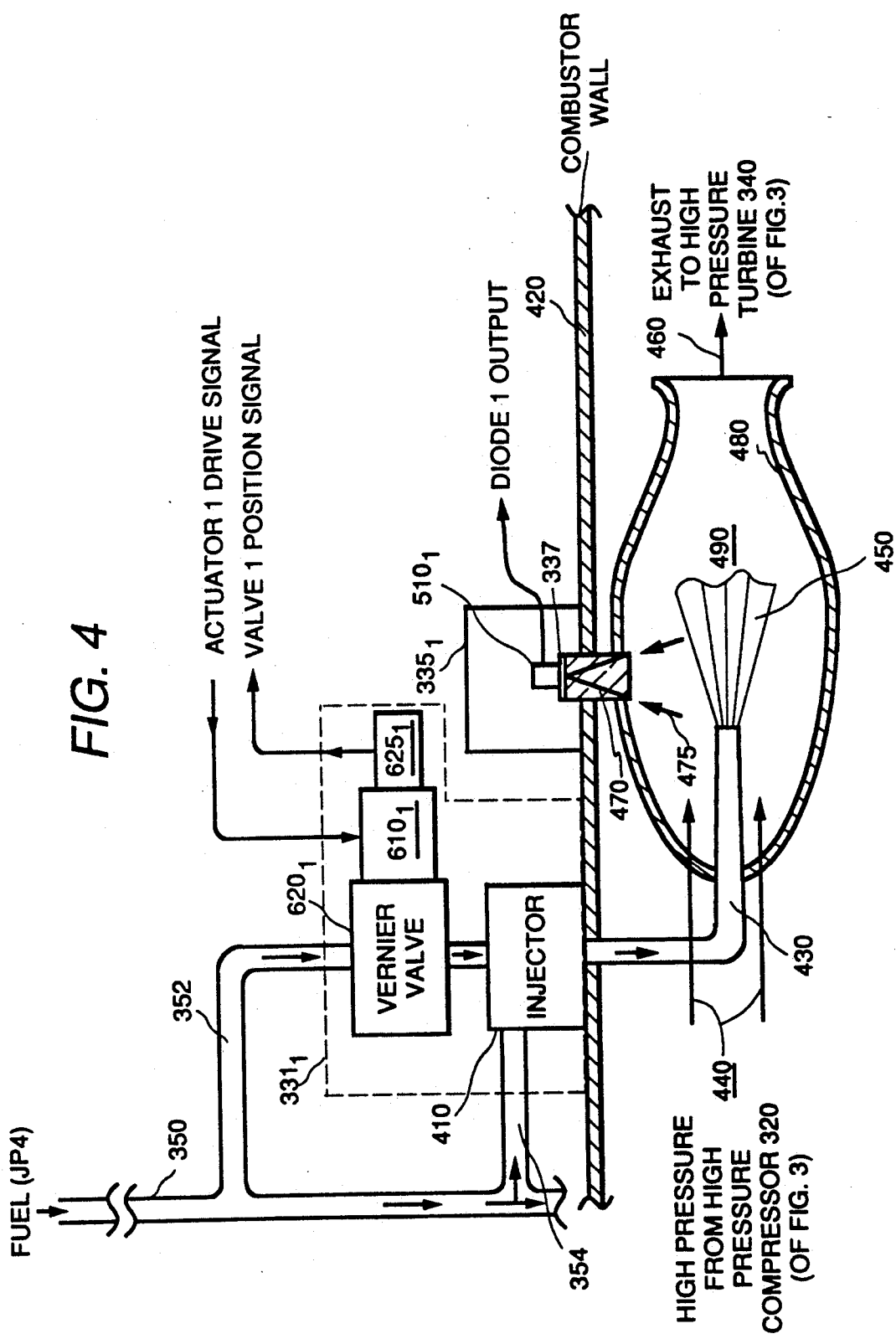
FIG. 4 is a simplified, partial-sectional diagram of a portion of the combustor stage in the jet engine shown in FIG. 3 and particularly showing use of the invention in connection with a specific fuel injector assembly in the engine of FIG. 3.

FIG. 4 depicts a simplified, partly sectional diagram of a portion of combustor stage 330 in jet engine 300 shown in FIG. 3, and particularly shows the use of the invention in connection with a fuel injector assembly $331_1$.

As shown, fuel injector assembly $331_1$ contains a vernier valve $620_1$, an actuator $610_1$, a position transducer $625_1$ and a fuel injector 410. Actuator $610_1$ provides a common shaft (not shown) which is connected both to an internal valve element within valve $620_1$ and to position transducer $625_1$. The position of this shaft, monitored through the position transducer, sets the opening of the valve.

Fuel injector 410 located within injector assembly 3311 is connected in parallel through two separate connections to fuel manifold 350: directly through fuel line 354, and via vernier valve $620_1$, through fuel line 352. Fuel flow occurs in the direction shown by the arrows within the fuel lines. Thus, based upon its setting, valve $620_1$ will route an additional amount of fuel to the injector beyond that flowing through fuel line 354. Injector 410 contains an injection nozzle assembly 430 which extends through combustor outer wall 420 and a flame shield 480 into combustion region 490. This nozzle is oriented to spray fuel into a high pressure air stream 440 flowing through the combustion region. The sprayed fuel is ignited (through a conventional ignition device, not shown), resulting in a flame 450 within the combustion region, for which only a portion of the base of the flame is shown. The resulting combustion produces a hot exhaust gas stream 460 which is routed to high pressure turbine stage 340 (FIG. 3).

In order to monitor the CO ultraviolet spectral emissions produced by flame 450, optical window 470 is appropriately mounted within combustor wall 420 and extends through flame shield 480. This window comprises any of a variety of appropriate well-known high temperature materials, such as quartz, which is substantially transparent to ultraviolet wavelengths in the 200-300 nm band, in combination with a multilayer thin film filter 337 such as is available from Acton Research Corp., Acton, Mass. The filter can be made selective to a 200-300 nm band or a 200-250 nm band, as desired, and extends across the entire surface of the window.

Detector assembly $335_1$ contains ultraviolet detector $510_1$ which is appropriately positioned to capture ultraviolet emissions through a viewing angle illustrated by rays 475, emanating from the base of the flame. Depending upon the size of the detector and the window, a suitable lens (not shown) may be interposed between the window and the ultraviolet detector to concentrate incident emissions onto an active portion of the detector itself. In order to provide excellent ultraviolet sensitivity and also proper operation at elevated temperatures (typically on the order of a few hundred degrees F) encountered near the external surface of combustor wall 420, a silicon carbide (SiC) photodiode is employed as ultraviolet detector $510_1$. One such illustrative photodiode, which is particularly useful for jet engine flame detection and incorporated herein by reference, is fully described in D. Brown et al. co-pending U.S. patent application "SILICON CARBIDE PHOTODIODE WITH IMPROVED SHORT WAVELENGTH RESPONSE AND VERY LOW LEAK- AGE CURRENT" filed concurrently herewith, and assigned to the instant assignee.

Figure 5:
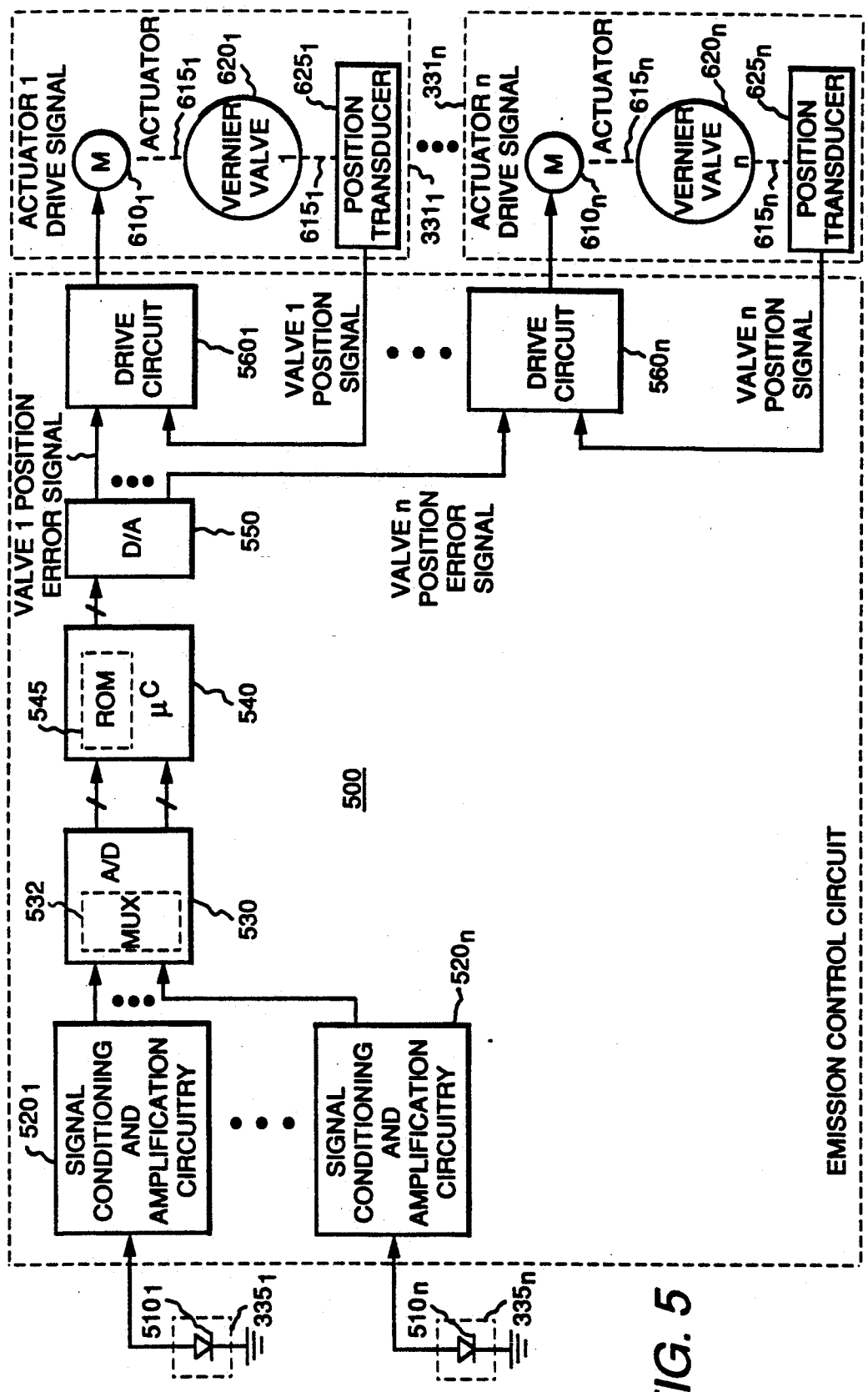
FIG. 5 is a high level block diagram of the inventive emission control circuit, shown in FIG. 3, and its related components.

FIG. 5 is a high level block diagram of emission control circuit 500, shown in FIG. 3, and its related components. Detector assemblies $335_1, \ldots, 335_n$ which contain SiC photodiodes $510_1, \ldots, 510_n$, respectively, are coupled to circuit 500 which, in turn, is coupled to fuel injector assemblies $331_1, \ldots, 331_n$. As noted above, each of these fuel injector assemblies, such as assemblies $331_1$ and $331_n$, includes an actuator, such as actuators $610_1$ and $610_n$, respectively, a vernier valve connected thereto, such as vernier valves $520_1$ (designated vernier valve 1') and $620_n$ (designated vernier valve n), and a corresponding position transducer, such as transducers $625_1$ and $625_n$, connected, typically through common shafting $615_1$ and $615_n$, to the respective actuator. Although the choice of actuator is not critical, it must withstand operation at the elevated temperatures near the external surface of the combustor wall and generate sufficient force to rapidly change the position of the vernier valve to a new position and, in conjunction with the associated drive circuit, accurately maintain this new position. The actuator can be any one of a variety of suitable motors, such as an appropriately sized stepping motor or DC servomotor, or it may comprise a solenoid. The position transducer can be either analog or digital, although digital, and particularly optical, is preferred owing to the relatively high noise immunity, circuit simplicity and high resolution that can be provided by such encoder. The encoder preferably should also provide a nondestructive reference position that can be mechanically set, during assembly of the associated valve assembly, to coincide with a known "home" valve position, i.e. fully open or closed. This reference position can be used by drive circuits $560_1$-$560_n$ in initializing their operation.

Circuit 500 contains signal conditioning and amplification circuits $520_1, \ldots, 520_n$; a multiplexed analog-to-digital (A/D) converter 530; a microcomputer 540, which may comprise any one of a variety of well-known conventional microcomputers; a digital-to-analog converter 550; and drive circuits $560_1, \ldots, 560_n$. Each of the signal conditioning and amplification circuits, such as circuit $520_1$, is coupled to an associated ultraviolet detector, such as SiC photodiode $510_1$. The current flow through such diode is governed by the amount of ultraviolet radiation incident on the diode. Each of circuits $520_1$-$520_n$ operates to convert the current flow through an associated photodiode into a corresponding voltage signal, and then amplify, linearize, filter and scale this signal. The resulting analog signals produced by circuits $520_1$-$520_n$ are supplied individually to multiplexed A/D converter 530 which, in turn, converts each such signal, in seriatim, into a digital value. The resulting digital values are routed, in parallel, to microcomputer 540 for subsequent processing. Under program control, the microcomputer provides instructions and control signals to multiplexed A/D converter 530 to select, via input multiplexer 532 of the A/D converter, which particular analog signal produced by circuits $520_1$-$520_n$ is to be digitized at any one time.

We have found that, as expected and as noted above, the measured intensity, i.e. the photodiode output signal, correlates well with the fuel/air mixture setting, the $NO_x$ concentration in the exhaust and the flame temperature, but that, surprisingly, the measured intensity of the CO spectral lines emanating from a primary combustion zone of the combustion flame as detected by the photodiode does not appear to track the CO concentration in the engine exhaust. Perhaps this latter result indicates that the CO produced in the primary combustion zone of the flame is converted to carbon dioxide ($CO_2$) in a secondary combustion zone of the flame, whereas the $NO_x$ produced in the hotter primary combustion zone remains unchanged as it emerges from the flame and enters the exhaust gas stream. Nevertheless, these results indicate that the intensities of the CO spectral emission lines are optical precursors of temperature and $NO_x$ production in the primary combustion zone. Hence, excellent dynamic turbine control can be established by first relating the detected CO spectral intensity levels to preferably corresponding $NO_x$ emission levels and then appropriately controlling the $NO_x$ emission level, through use of a closed-loop feedback system, to a desired value.

In response to the digitized values produced by A/D converter 530 for each diode, such as for diode $510_1$, microcomputer 540 internally generates a positional error signal for each corresponding vernier valve assembly, such as for injector assembly $331_1$ (FIG. 3). This error signal represents an appropriate change (both in terms of direction and magnitude) in position of the internal valve element for that valve assembly in order to properly change the corresponding fuel/air mixture produced by that valve assembly to assure that the actual $NO_x$ exhaust emission concentration (or flame temperature which will produce this concentration), as indirectly measured through the photodiode, will be controlled to dynamically coincide with a desired value thereof. Through this closed-loop control methodology, the position of each vernier valve is dynamically changed as needed to maintain its corresponding positional error signal at zero. Inasmuch as the maximum $NO_x$ and CO emission limits are $E_{NOx}$ and $E_{CO}$, as shown in FIG. 2, then through dynamic control of the fuel/air mixture for all the vernier valves such that the turbine continuously operates within region 250 of FIG. 2 (and preferably at point P) throughout its full range of power, both CO and $NO_x$ exhaust emissions can be reduced below these limits while maintaining a sufficiently high flame temperature to avoid a "flame-out" condition.

In order to generate each positional error signal, microcomputer 540 first converts a digitized value provided by A/D converter 530 for each diode, such as that for diode $510_1$, into a corresponding actual $NO_x$ exhaust gas concentration value. This conversion is preferably accomplished through interpolation of stored values provided by a first look-up table stored in a read only memory (ROM) 545 of the microcomputer. Thereafter, the microcomputer measures any difference between the value of the actual $NO_x$ concentration and a desired value thereof. This measured difference is converted through another table look-up operation into a corresponding value for the positional error signal, through use of a second table of values stored in ROM 545 that relates this difference to a stored value. The look-up tables are established from appropriate empirical measurements. To reduce the size of the look-up tables, mathematical interpolation may be used in conjunction with retrieval of appropriate stored values from either table. Alternatively, if processing time and other design considerations permit, an appropriate mathematical formula, such as determinable through appropriate curve fitting of empirical data, can be calculated in lieu of performing table look-up operations. Microcomputer 540 generates a separate digital position error signal for each different vernier valve assembly. These digitized error signals are then converted into analog form by digital-to-analog (D/A) converter 550 which, in turn, supplies a separate analog error signal to each of drive circuits $560_1$–$560_n$. Each of these drive circuits (e.g. circuit $560_1$ or $560_n$) generates an actuator drive signal which, based upon the existing valve position feedback signal supplied by a corresponding vernier valve assembly and the corresponding valve position error signal, cause the actuator (e.g. actuator $610_1$ or $610_n$) in that assembly to rotate the valve element (e.g. for valve $620_1$ or $620_n$) therefor in a direction which drives this position error signal to zero.

While the control methodology has been described above in terms of generating a separate position error signal for each ultraviolet detector or photodiode, the microcomputer can alternatively average the digitized values produced by A/D converter 530 for all the photodiodes together and provide a single position error signal to all the drive circuits to appropriately and identically vary the position of all the vernier valves in unison. While this alternative methodology is not likely to provide control over the fuel/air mixture that is as locally accurate as obtainable through use of separate position error signals, the overall results, i.e. in terms of $NO_x$ emission concentration and combustion flame temperature, attained through either methodology, will be very similar. Nevertheless, with either methodology, use of simultaneous measurements of flame CO ultraviolet spectral emission from multiple ultraviolet detectors can facilitate more accurate $NO_x$ emission and flame temperature control than obtainable through use of a single ultraviolet detector.

Although each vernier valve has been described as being connected in parallel with a corresponding fuel line (e.g. fuel line 354 shown in FIGS. 3 and 4) that is connected to a fuel injector, each vernier valve can alternatively be connected in series between the fuel manifold and fuel injector. However, a parallel connection would likely be favored to permit fuel to flow to the injector should a vernier valve fail in a closed position. Moreover, to enhance failure response, a digitally activated switch can be connected, respectively, in series with each drive circuit and its respective associated D/A converter circuitry. The switch can apply either an analog position error signal generated by D/A converter 550 or a fixed analog reference signal associated with a predetermined desired valve position, e.g. closed, half-open or fully-open, to each corresponding drive circuit. In use, the switch can be operated by a well-known "watchdog" timer which is continually reset, e.g. on a continuously-timed interrupt basis, by the microcomputer. As long as the microcomputer is properly operating, the timer will not reach the end of a preset timing interval, i.e. will not "time-out", and hence the switch will continue to apply the analog position error signal to its corresponding drive circuit. However, should the microcomputer fail, the watchdog timer will "time-out", causing, for example, all the switches to by-pass the microcomputer and route the reference signal to each drive circuit. This, in turn, will cause the drive circuits to maintain each of the vernier valves in these known positions. The watchdog timer can also be used to activate a suitable warning indicator that alerts service personnel to this failure condition.

Furthermore, while the foregoing methodology has been described primarily in terms of measuring, at least indirectly, and preferably tracking $NO_x$ emissions based upon intensity of the ultraviolet CO flame emission spectra, the high correlation, as previously noted, between these emission spectra and either the $NO_x$ concentration or the combustion flame temperature permits either of these latter two parameters to be used to dynamically control the turbine, on a closed-loop feedback basis, to operate continuously in a "lean-burn" condition. Moreover, to the extent that flame temperature can be measured directly, such as through use of a suitable thermocouple situated in the combustion flame, the vernier valve assemblies in the jet engine can be directly controlled in accordance with measured flame temperatures. However, since jet engine manufacturers generally do not incorporate temperature sensing devices into the combustion area of the engine because of the high potential for damage to the turbine sections of the engine if the detector should loosen or break apart, the optical flame detection of the type herein described is highly preferable to other forms of flame measurement.

While only certain preferred features of the invention have been illustrated and described herein, many other modifications and changes will occur to those skilled in the art. It is, therefore, to be understood that the appended claims are intended to cover all such modifications and changes as fall within the true spirit of the invention.

We claim:

1. Apparatus for reducing nitrogen oxide ($NO_x$) exhaust emissions resulting from combustion of a mixture of hydrocarbon fuel and air within a gas turbine without undue risk of flame-out comprising:

means for measuring intensity of a predetermined band of ultraviolet carbon monoxide (CO) spectral lines emanating from a combustion flame in said turbine;

means for converting the measured intensity value of said predetermined band of ultraviolet CO spectral lines into a corresponding value of a turbine operating parameter, said parameter being either temperature of said flame or $NO_x$ concentration in said exhaust emissions; and means for dynamically adjusting the fuel/air mixture for said turbine such that the value of said turbine operating parameter remains below a predetermined limit.

2. The apparatus of claim 1 wherein said means for measuring intensity of a predetermined band of ultraviolet carbon monoxide (CO) spectral lines comprises means for measuring intensity of a band extending from approximately 200 nm to approximately 250 nm in wavelength, inclusive.

3. The apparatus of claim 1 wherein said means for measuring comprises a silicon carbide photodiode.

4. The apparatus of claim 1 wherein said means for dynamically adjusting the fuel/air mixture for said turbine comprises means for adjusting the fuel/air mixture so as to maintain said predetermined limit for $NO_x$ concentration in said exhaust emissions at 25 parts per million.

5. The apparatus of claim 1 wherein said means for dynamically adjusting the fuel/air mixture for said turbine comprises means for adjusting the fuel/air mixture so as to maintain said predetermined limit for flame temperature at a temperature above which a flame-out condition due to low flame temperature will not occur.

6. The apparatus of claim 3 wherein said gas turbine comprises:
- a combustion stage including an internal combustion region and an outer wall and further including a fuel manifold situated external to the outer wall;
- a vernier valve assembly including a vernier fuel valve and being mounted to an external surface of the outer wall for controllably varying said fuel/air mixture in response to a drive signal and for producing a position signal representing the size of the vernier fuel valve opening;, and
- an optical window substantially transparent to ultraviolet wavelengths within said band, said window extending through said outer wall and providing optical communication with said internal combustion region, said window being situated to permit optical emission from the base of said flame in said band to be detectable through said window;
- said silicon carbide photodiode being mounted external to said outer wall and oriented with respect to said window so as to detect said optical emission in said band through said window; and
- said apparatus comprising circuit means responsive to said vernier valve assembly and said photodiode for generating said drive signal so as to controllably vary the size of said vernier fuel valve opening in order to maintain said turbine operating parameter value at a predetermined operating point.

7. The apparatus of claim 6 wherein said vernier valve assembly further comprises:
- a fuel injector mounted to said outer wall and extending through said outer wall into said combustion region for injecting fuel from said manifold into the combustion region, said injector being connected to receive fuel from both said manifold and the vernier fuel valve;
- the vernier fuel valve being connected to said manifold for controllably routing fuel from said manifold to said injector;
- said vernier valve assembly including a position transducer operative in response to the size of said vernier fuel valve opening for generating said position signal; and
- an actuator coupled to said circuit means and connected to said vernier fuel valve for varying the size of the opening of said vernier fuel valve in accordance with said drive signal.

8. The apparatus of claim 1 wherein said gas turbine comprises:
- a combustion stage including an internal combustion region and an outer wall and further including a fuel manifold situated external to the outer wall;
- a plurality of vernier valve assemblies mounted around said combustion stage at equal spacings and concentric with the longitudinal axis of said turbine, each of said assemblies including a vernier fuel valve, respectively, and being connected to said fuel manifold such that the vernier fuel valve within each of said assemblies controllably routes fuel from said manifold to said combustion stage in a manner that varies the fuel/air mixture entering said combustion stage therefrom; and
- a plurality of optical windows disposed at equal spacings around said combustion stage and concentrically oriented with said longitudinal axis, each of said windows being substantially transparent to ultraviolet wavelengths within said band and extending through said outer wall so as to provide optical communication with said internal combustion region, each of said windows being situated to permit optical emission from the base of said flame in said band to be detectable therethrough;
- said means for measuring intensity comprising a plurality of silicon carbide photodiodes, each respective one of said photodiodes being situated in the vicinity where the fuel/air mixture enters said combustion stage from a corresponding one of the vernier fuel valves, respectively, within said valve assemblies, each of said photodiodes being mounted external to said outer wall and oriented so as to detect said optical emission in said band emanating through a corresponding one of said windows, respectively, and from a portion of the base of the flame attributable to said corresponding one of the vernier fuel valves; and
- said apparatus further comprising circuit means connected to each of said valve assemblies and to each of said photodiodes for generating a drive signal for each of said valve assemblies, respectively, in response to an output signal from each of said photodiodes, respectively, and to a position signal generated by each of said valve assemblies, respectively, so as to control the opening of the vernier valve within said each assembly, respectively, and thereby locally vary the fuel/air mixture attributable thereto.

9. The apparatus of claim 8 wherein said circuit means further comprises means responsive to the output signal of each of said photodiodes, respectively, for generating a separate position error signal for a corresponding one of said valve assemblies respectively.

10. The apparatus of claim 8 wherein said circuit means further comprises means responsive to the output signal of each of said photodiodes for generating a common position error signal for all of said valve assemblies.

11. Apparatus for reducing nitrogen oxide ($NO_x$) exhaust emissions resulting from combustion of a mixture of hydrocarbon fuel and air within a turbine engine without undue risk of flame-out, said turbine engine including:
- a combustion stage having an internal combustion region and an outer wall and further including a fuel manifold situated external to said outer wall;
- a vernier valve assembly including a vernier fuel valve and being mounted to an external surface of the outer wall for controllably varying the components of said mixture in response to a drive signal and for producing a position signal representing the size of the vernier fuel valve opening; and
- an optical window extending through said outer wall and providing optical communication with said internal combustion region, said window being situated to permit optical emission emanating from the base of a combustion flame in said combustion region to be detectable through said window;
- said apparatus comprising means for measuring intensity of a predetermined band of ultraviolet carbon monoxide (CO) spectral lines emanating from the combustion flame, said measuring means being mounted external to said outer wall and oriented with respect to said window so as to detect said optical emission through said window; and circuit means responsive to said vernier valve assembly and to said measuring means for generating said drive signal so as to controllably vary the size of said vernier fuel valve opening in order to maintain the temperature of said combustion flame above a predetermined value.

12. The apparatus of claim 11 wherein said means for measuring intensity of a predetermined band of ultraviolet carbon monoxide (CO) spectral lines comprises means for measuring intensity of a band extending from approximately 200 nm to approximately 250 nm in wavelength, inclusive.

13. The apparatus of claim 11 wherein said measuring means comprises a silicon carbide photodiode.

14. The apparatus of claim 13 wherein the predetermined value of said flame temperature is a temperature associated with a $NO_x$ concentration in said exhaust emissions equal to or less than 25 parts per million.

15. The apparatus of claim 13 wherein the predetermined value of said flame temperature is a flame temperature associated with a flame-out condition in said turbine engine.

16. The apparatus of claim 13 wherein said vernier valve assembly further comprises:
  a fuel injector mounted to said outer wall and extending through said outer wall into said combustion region for injecting fuel from said manifold into the combustion region, said injector being connected to receive fuel from both said manifold and the vernier fuel valve;
  the vernier fuel valve being connected to said manifold for controllably routing fuel from said manifold to said injector;
  said vernier valve assembly including a position transducer operative in response to the size of said vernier fuel valve opening for generating said position signal; and
  an actuator coupled to said circuit means and connected to said vernier fuel valve for varying the size of the opening of said vernier fuel valve in accordance with said drive signal.

17. The apparatus of claim 16 wherein said circuit means further comprises means responsive to the output signal of said photodiode for generating a position error signal associated with said vernier fuel valve in response to a difference between actual combustion flame temperature and the predetermined value of said flame temperature, and a drive signal in response to said position error signal and said position signal.

18. Apparatus for reducing nitrogen oxide ($NO_x$) exhaust emissions resulting from combustion of a mixture of hydrocarbon fuel and air within a turbine engine without increased risk of flame-out, said turbine engine including:
  a combustion stage having an internal combustion region and an outer wall and further including a fuel manifold situated external to said outer wall;
  a plurality of vernier valve assemblies mounted around said combustion stage at equal spacings and concentric with the longitudinal axis of said turbine, each of said assemblies including a vernier fuel valve, respectively, and being connected to said fuel manifold such that the vernier fuel valve within each of said assemblies controllably routes fuel from said manifold to said combustion stage in a manner that varies the fuel/air mixture entering said combustion stage therefrom; and
  a plurality of optical windows disposed at equal spacings around said combustion stage and concentrically oriented with respect to said longitudinal axis, each of said windows being substantially transparent to ultraviolet wavelengths within a band of carbon monoxide spectral lines and extending through said outer wall so as to provide optical communication with said internal combustion region, each of said windows being situated to permit optical emission from the base of said flame in said band to be detectable therethrough;
  said apparatus comprising a plurality of silicon carbide photodiodes, each respective one of said photodiodes being situated in the vicinity where the fuel/air mixture enters said combustion stage from a corresponding one of the vernier fuel valves, respectively within said valve assemblies, each of said photodiodes being mounted external to said outer wall and oriented so as to detect said optical emission in said band emanating through a corresponding one of said windows, respectively, and from a portion of the base of the flame attributable to said corresponding one of the vernier fuel valves;
  said apparatus further comprising circuit means coupled to each of said valve assemblies and to each of said photodiodes for generating a drive signal for each of said valve assemblies, respectively, in response to an output signal from each of said photodiodes, respectively, and to a position signal generated by each of said valve assemblies, respectively, so as to control the opening of the vernier valve within said each assembly, respectively, and thereby locally vary the fuel/air mixture attributable thereto.

19. The apparatus of claim 18 wherein said circuit means further comprises means responsive to the output signal of each of said photodiodes, respectively, for generating a separate position error signal for a corresponding one of said valve assemblies respectively.

20. The apparatus of claim 19 wherein said circuit means further comprises means responsive to the output signal of each of said photodiodes for generating a common position error signal for all of said valve assemblies.

21. A method of reducing nitrogen oxide ($NO_x$) exhaust emissions resulting from combustion of a mixture of hydrocarbon fuel and air within a gas turbine without undue risk of flame-out comprising:
  measuring intensity of a predetermined band of ultraviolet carbon monoxide (CO) spectral lines emanating from a combustion flame in said turbine;
  converting the measured intensity value of said predetermined band of ultraviolet CO spectral lines into a corresponding value of a turbine operating parameter; and
  dynamically adjusting the fuel/air mixture for said turbine such that the value of said turbine operating parameter remains below a predetermined limit.

22. The method of claim 21 wherein the predetermined band of ultraviolet carbon monoxide (CO) spectral lines extends from approximately 200 nm to approximately 250 nm in wavelength, inclusive.

23. The method of claim 21 wherein said corresponding value of a turbine operating parameter comprises temperature of said flame.

24. The method of claim 21 wherein said corresponding value of a turbine operating parameter comprises $NO_x$ concentration in said exhaust emissions.

25. The method of claim 21 wherein said predetermined limit for $NO_x$ concentration in said exhaust emissions is 25 parts per million.

26. The method of claim 21 wherein said predetermined limit for flame temperature is a temperature above which a flame-out condition due to low flame temperature will not occur.

27. The method of claim 21 wherein the step of measuring intensity of a predetermined band of ultraviolet carbon monoxide (CO) spectral lines comprises the step of directing radiation from said combustion flame onto a silicon carbide photodiode exhibiting substantial sensitivity to ultraviolet radiation within a band of 200 nm to 250 nm wavelength, inclusive.

28. Apparatus for reducing nitrogen oxide ($NO_x$) exhaust emissions resulting from combustion of a mixture of hydrocarbon fuel and air within a gas turbine without undue risk of flame-out comprising:
    means for measuring intensity of a predetermined band of non-infrared spectral lines emanating from a combustion flame in said turbine;
    means for converting the measured intensity value of said predetermined band of non-infrared spectral lines into a corresponding value of a turbine operating parameter, said parameter being either temperature of said flame or $NO_x$ concentration in said exhaust emissions; and
    means for dynamically adjusting the fuel/air mixture for said turbine such that the value of said turbine operating parameter remains below a predetermined limit.

29. The apparatus of claim 28 wherein said predetermined band of non-infrared spectral lines comprises a band of ultraviolet spectral lines.

30. The apparatus of claim 29 wherein said means for measuring intensity of a predetermined band of ultraviolet spectral lines comprises means for measuring intensity of a band extending from approximately 200 nm to approximately 250 nm in wavelength, inclusive.

31. The apparatus of claim 29 wherein said means for measuring intensity of a predetermined band of ultraviolet spectral lines comprises means for measuring intensity of a band extending from approximately 200 nm to approximately 300 nm in wavelength, inclusive.

32. The apparatus of claim 29 wherein said means for measuring comprises a silicon carbide photodiode.

33. The apparatus of claim 29 wherein said means for dynamically adjusting the fuel/air mixture for said turbine comprises means for adjusting the fuel/air mixture so as to maintain said predetermined limit for $NO_x$ concentration in said exhaust emissions at 25 parts per million.

34. The apparatus of claim 29 wherein said means for dynamically adjusting the fuel/air mixture for said turbine comprises means for adjusting the fuel/air mixture so as to maintain said predetermined limit for flame temperature at a temperature above which a flame-out condition due to low flame temperature will not occur.

35. The apparatus of claim 32 wherein said gas turbine comprises:
    a combustion stage including an internal combustion region and an outer wall and further including a fuel manifold situated external to the outer wall;
    a vernier valve assembly including a vernier fuel valve and being mounted to an external surface of the outer wall for controllably varying said fuel/air mixture in response to a drive signal and for producing a position signal representing the size of the vernier fuel valve opening; and
    an optical window substantially transparent to ultraviolet wavelengths within said band, said window extending through said outer wall and providing optical communication with said internal combustion region, said window being situated to permit optical emission from the base of said flame in said band to be detectable through said window;
    said silicon carbide photodiode being mounted external to said outer wall and oriented with respect to said window so as to detect said optical emission in said band through said window; and
    said apparatus comprising circuit means responsive to said vernier valve assembly and said photodiode for generating said drive signal so as to controllably vary the size of said vernier fuel valve opening in order to maintain said turbine operating parameter value at a predetermined operating point.

36. Apparatus for reducing nitrogen oxide ($NO_x$) exhaust emissions resulting from combustion of a mixture of hydrocarbon fuel and air within a turbine engine without undue risk of flame-out, said turbine engine including:
    a combustion stage having an internal combustion region and an outer wall and further including a fuel manifold situated external to said outer wall;
    a vernier valve assembly including a vernier fuel valve and being mounted to an external surface of the outer wall for controllably varying the components of said mixture in response to a drive signal and for producing a position signal representing the size of the vernier fuel valve opening; and
    an optical window extending through said outer wall and providing optical communication with said internal combustion region, said window being situated to permit optical emission emanating from a combustion flame in said combustion region to be detectable through said window;
    said apparatus comprising means for measuring intensity of a predetermined band of ultraviolet spectral lines emanating from the combustion flame, said measuring means being mounted external to said outer wall and oriented with respect to said window so as to detect said optical emission through said window; and
    circuit means responsive to said vernier valve assembly and to said measuring means for generating said drive signal so as to controllably vary the size of said vernier fuel valve opening in order to maintain the temperature of said combustion flame above a predetermined value.

37. The apparatus of claim 36 wherein said means for measuring intensity of a predetermined band of ultraviolet carbon monoxide (CO) spectral lines comprises means for measuring intensity of a band extending from approximately 200 nm to approximately 250 nm in wavelength, inclusive.

38. The apparatus of claim 37 wherein said means for measuring intensity of a predetermined band of ultraviolet carbon monoxide (CO) spectral lines comprises means for measuring intensity of a band extending from approximately 200 nm to approximately 300 nm in wavelength, inclusive.

39. The apparatus of claim 36 wherein said measuring means comprises a silicon carbide photodiode.

40. The apparatus of claim 39 wherein the predetermined value of said flame temperature is a temperature associated with a $NO_x$ concentration in said exhaust emissions equal to or less than 25 parts per million.

41. The apparatus of claim 39 wherein the predetermined value of said flame temperature is a flame temperature associated with a flame-out condition in said turbine engine.

42. A method of reducing nitrogen oxide ($NO_x$) exhaust emissions resulting from combustion of a mixture of hydrocarbon fuel and air within a gas turbine without undue risk of flame-out comprising:
   measuring intensity of a predetermined band of ultraviolet spectral lines emanating from a combustion flame in said turbine;
   converting the measured intensity value of said predetermined band of ultraviolet spectral lines into a corresponding value of a turbine operating parameter; and
   dynamically adjusting the fuel/air mixture for said turbine such that the value of said turbine operating parameter remains below a predetermined limit.

43. The method of claim 42 wherein the predetermined band of ultraviolet spectral lines extends from approximately 200 nm to approximately 250 nm in wavelength, inclusive.

44. The method of claim 42 wherein the predetermined band of ultraviolet spectral lines extends from approximately 200 nm to approximately 300 nm in wavelength, inclusive.

45. The method of claim 42 wherein said corresponding value of a turbine operating parameter comprises temperature of said flame.

46. The method of claim 42 wherein said corresponding value of a turbine operating parameter comprises $NO_x$ concentration in said exhaust emissions.

47. The method of claim 42 wherein said predetermined limit for $NO_x$ concentration in said exhaust emissions is 25 parts per million.

48. The method of claim 42 wherein said predetermined limit for flame temperature is a temperature above which a flame-out condition due to low flame temperature will not occur.

49. The method of claim 42 wherein the step of measuring intensity of a predetermined band of ultraviolet spectral lines comprises the step of directing radiation from said combustion flame onto a silicon carbide photodiode exhibiting substantial sensitivity to ultraviolet radiation within a band of 200 nm to 250 nm wavelength, inclusive.

50. The method of claim 42 wherein the step of measuring intensity of a predetermined band of ultraviolet spectral lines comprises the step of directing radiation from said combustion flame onto a silicon carbide photodiode exhibiting substantial sensitivity to ultraviolet radiation within a band of 200 nm to 300 nm wavelength, inclusive.

* * * * *